Sept. 7, 1948.  H. W. ANDERSON  2,448,654
HIGH-LOW GAS VALVE
Filed June 4, 1947
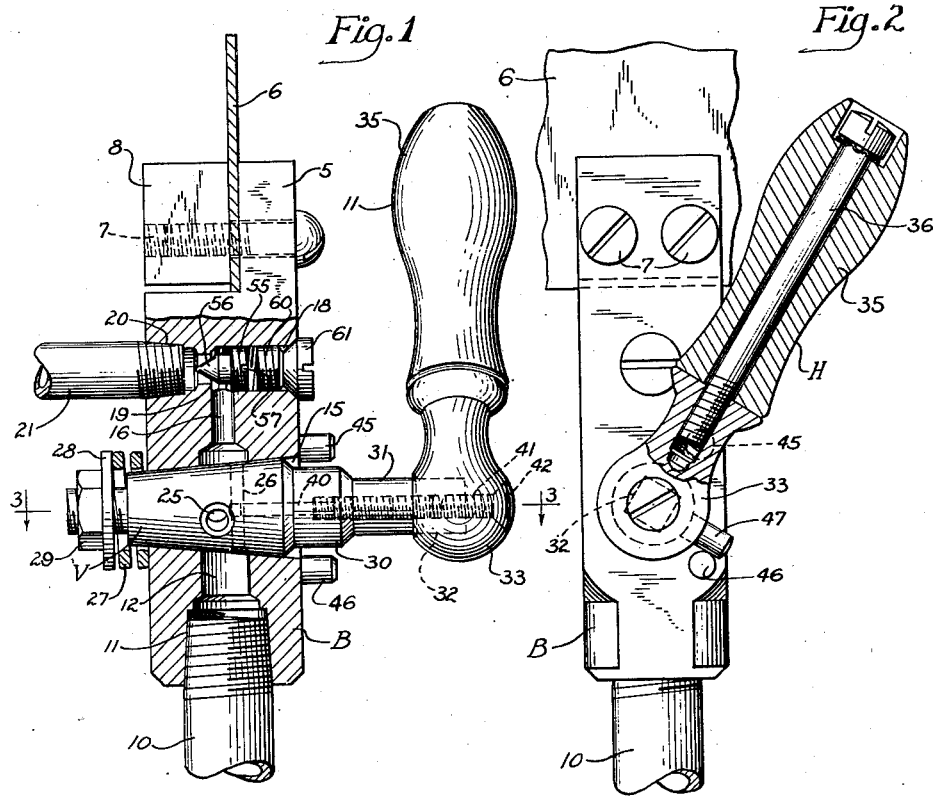
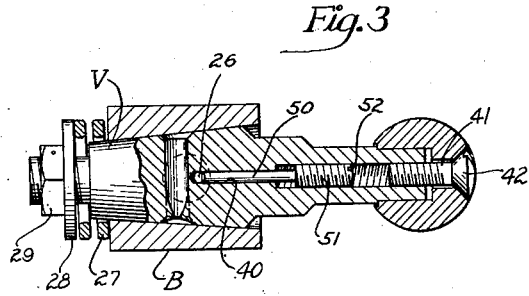
INVENTOR.
Harry W. Anderson
BY
Blumming & Blumming
Attys.

Patented Sept. 7, 1948

2,448,654

UNITED STATES PATENT OFFICE 2,448,654

HIGH-LOW GAS VALVE

Harry W. Anderson, Chicago, Ill.

Application June 4, 1947, Serial No. 752,425

5 Claims. (Cl. 277—64)

This invention relates to a gas valve for coffee urns and other installations where two successive positions are desired, one for a high flame and the other for a low flame. The valve herein to be described is designed primarily for such a use. It is advantageous in the respects of its simplicity, dependability, protection against tampering, etc. These and other objects and purposes are effectively served by a construction of which a preferred embodiment is illustrated in the accompanying drawing in the manner following:

Figure 1 is a vertical section through the valve in its entirety;

Fig. 2 is a front elevation thereof; and

Fig. 3 is a horizontal section taken on line 3—3 of Fig. 1.

The valve body B is shown to be of generally square contour in cross section with an upper extension 5 at the front adapted to be fitted against the lower portion of an apron 6 depending from an urn (not shown). Through this extension is inserted a screw 7 adapted to engage with a block 8 to the rear of the apron whereby the valve body may be clamped securely in position.

A gas inlet pipe 10 enters into a threaded socket 11 at the lower end of the valve body for screw threaded connection therewith. Extending upwardly from the socket is a passageway 12 which is intersected by a transverse opening 15 tapered slightly from front to rear; shortly beyond this opening the passageway continues on in a reduced diameter at 16 to communicate with a second transverse opening 18 which is shouldered at 19 where a neck is formed at the point of juncture with a threaded socket 20 which opens out upon the rear side of the body. A gas outlet pipe 21 leads from this socket to the burner (or burners), not shown.

Fitted rotatably within the tapered opening 15 is a valve V in the form of a tapered plug through which is a large transverse port 25 and at a wide angle thereto a second transverse port 26 of smaller diameter. Each of these ports at both ends is adapted to communicate with the passageway 12 when the valve is in the proper rotative position for this purpose. As by means of a spring 27 confined between a washer 28 and the rear face of the body B, together with a nut 29 that is threaded onto a stem projecting axially from the valve plug V, the latter is secured firmly yet rotatably within the opening 15.

The valve plug extends outwardly and forwardly of the body B in the form of a hub 30 from which is projected an axial stem 31 which in its outer end region 32 changes to square cross section for reception within a lateral socket of like contour formed in the base 33 of an operating handle H. As shown, this handle comprises a grip 35 through which is extended a bolt 36 in screw threaded engagement with the base 33. Extended axially through the stem 31, hub 30, and plug of the valve V, and in communication at its inner end with the smaller transverse port 26, is a bore 40 that is enlarged and screw-threaded in its outer end region to receive a lock screw 41 having a head 42 which is adapted to engage the handle base 33. The juncture of the round and square contours of the stem 31 provides a shoulder against which the base 33 is rested when engaged by the head of the lock screw 41. By some such means as this the handle is secured against displacement from the stem 31 to which it is adapted to impart rotary movements.

I provide limit stops whereby the range of rotary movement of the valve plug is fixed. As shown, these stops comprise a pair of pins 45 and 46 anchored in the body B for projection outwardly from its front face for successive engagement by a pin 47 which is anchored to the handle base 33 for projection radially therefrom. As shown in Fig. 2, the handle pin 47 is engaged with the lower stop pin 46 whereby to limit the rotative movement of the valve plug clockwise (as viewed in Fig. 2) to the position shown. Its opposite position is reached when the handle pin 47 is engaged with the upper stop pin 45.

Within the bore 40 is fitted a regulating screw comprising a stem 50 adapted in its advanced position to traverse the port 26 to substantially close the passageway therethrough, this stem being extended axially from a head 51 which is threaded for coaction with the screw threads of the bore. In the outer end of the head is a slot 52 engageable by a screw-driver or other small tool when entered through the bore from its outer end. For this purpose the handle screw 41 is first removed. When in place, this screw protects and conceals the regulating screw inwardly thereof. Adjustment of the regulating screw is usually made by an expert, but thereafter it normally remains untouched in regular use of the gas valve.

The transverse opening 18 is screw-threaded to receive a pressure regulating valve comprising a threaded closure plug 55 from which is extended a conical valve member 56 adapted to occupy a variable spaced relation to the circular shoulder 19 which forms a valve seat therefor. A screwdriver slot 57 may be formed in the plug 55 whereby to facilitate adjustment thereof so that the conical valve member 56 will occupy a desired position relative to its coacting valve seat. By the means described, the area of the passageway into the socket 20 may be varied as desired. A threaded screw plug 60 is also engaged within the bore 18. This plug is provided with a slotted head 61 adapted for engagement with the entrance to the opening 18 to effectively close the same. When in the position shown in Fig. 1, the pressure-regulating valve is both concealed and protected so that in the subsequent use of the gas valve the initial adjustment will not be changed.

In operation, the gas in flowing from the inlet pipe to the outlet pipe, will pass through either the large port 25 or the small port 26 of the valve V, depending upon the position to which the plug is rotated by operation of the handle H. With the larger port 25 in open position, a high flame is assured, whereas with the smaller port 26 in open position, a low flame will be maintained. A change from one to the other may be made rapidly and dependably simply by flopping over the handle H from one off-center position to an opposite off-center position. Since the handle normally lies to one side of center, this is a sufficient safeguard against its accidental displacement from either of its two predetermined positions. The size of the low flame will depend in large part upon the amount of gas that is permitted to flow through the smaller port 26, and since this is determined by the adjusted position of the stem 50 of the regulating screw, it is obvious that provision is thereby made for assuring a low flame of desired size within rather wide limits.

Because of the protection that is afforded to this regulating screw by the outer lock screw 41, there is little or no likelihood of any tampering with the regulating screw by one who may be operating the valve in the regular course of his duties and who, in most cases, is inexpert in the matter of adjustments.

The provision of the pressure-regulating valve 56 is advantageous because it affords means whereby to meet varying conditions of gas pressure, etc. As in the case of the regulating screw, this valve is operated by means which is normally concealed, and so is protected during everyday use of the gas valve, yet is relatively accessible to a service man whenever any occasion arises for giving it attention.

I claim:

1. A gas valve having a body through which is a passageway in connection with an inlet and outlet and a tapered opening traversing the body and intersecting the passageway therethrough, a tapered valve plug rotatably fitted in the tapered opening and provided with a pair of angularly-related transverse ports therethrough, one large and the other small, each adapted separately in one rotative position of the plug to establish communication with the passageway and in a second rotative position to disestablish communication with the passageway, the valve plug being axially extended exteriorly of the body in the form of a stem, a handle fitted non-rotatably to the stem for operation of the valve plug, limit stops engageable with the handle to confine its operative movements to a range between the two positions of the plug above noted, there being formed in the plug an axial bore communicating with the smaller transverse port and extending therefrom to the outer end of the stem, screw threads formed within the axial bore, a regulating screw within the bore coacting with the screw threads therein adapted, upon rotation, to advance toward or recede from the inner end of the bore, whereby to open or close the smaller transverse port in varying degree, and a lock screw within the bore having a head exteriorly thereof in engagement with the handle, the lock screw coacting with the screw threads of the bore to secure the handle against axial displacement from the stem.

2. A gas valve having a body through which is a passageway in connection with an inlet and outlet and a tapered opening traversing the body and intersecting the passageway therethrough, a tapered valve plug rotatably fitted in the tapered opening and provided with a pair of angularly-related transverse ports therethrough each adapted separately in one rotative position of the plug to establish communication with the passageway and in a second rotative position to disestablish communication with the passageway, the valve plug being axially extended exteriorly of the body in the form of a stem, a handle fitted non-rotatably to the stem for operation of the valve plug, limit stops for confining operative movements of the valve plug to a range between the two positions above noted, there being formed in the plug an axial bore communicating with one of the transverse ports and extending therefrom to the outer end of the stem, screw threads formed within the axial bore, and a regulating screw within the bore coacting with the screw threads therein adapted, upon rotation, to advance toward or recede from the inner end of the bore, whereby to open or close the communicating transverse port in varying degree.

3. A gas valve having a body through which is a passageway in connection with an inlet and outlet and a tapered opening traversing the body and intersecting the passageway therethrough, a tapered valve plug rotatably fitted in the tapered opening and provided with a pair of angularly-related transverse ports therethrough, each adapted separately in one rotative position of the plug to establish communication with the passageway and in a second rotative position to disestablish communication with the passageway, the valve plug being extended exteriorly of the body, a handle fitted non-rotatably to the plug end exteriorly of the body for operation of the valve plug, there being formed in the plug an axial bore communicating with one of the transverse ports and extending therefrom to the outer end of the plug, screw threads formed within the axial bore, a regulating screw within the bore coacting with the screw threads therein adapted, upon rotation, to advance toward and recede from the inner end of the bore whereby to open or close the communicating transverse port in varying degree, and a lock screw coaxial with the regulating screw having a head exteriorly thereof in engagement with the handle, the lock screw coacting with the screw threads of the bore to secure the handle against axial displacement from the stem.

4. A gas valve having a body through which is a passageway in connection with an inlet and outlet and an opening traversing the body and intersecting the passageway therethrough, a valve plug rotatably secured in the opening and provided with a pair of angularly-related transverse ports therethrough, each adapted separately in one rotative position of the plug to establish communication with the passageway and in a second rotative position to disestablish communication with the passageway, the valve plug being extended exteriorly of the body, a handle fitted non-rotatably to the plug end exteriorly of the body for operation of the valve plug, there being formed in the plug an axial bore communicating with one of the transverse ports and extending therefrom to the outer end of the plug, screw threads formed within the axial bore, a regulating screw within the bore coacting with the screw threads therein adapted, upon rotation, to advance toward and recede from the inner end of the bore whereby to open or close the communicating transverse port in varying degree, and a lock screw coaxial with the regulating screw having a head exteriorly thereof in engagement with the handle, the lock screw coacting with the screw threads of the bore to secure the handle against axial displacement from the stem.

5. A gas valve having a body through which is a passageway in connection with an inlet and outlet and a tapered opening traversing the body and intersecting the passageway therethrough, a tapered valve plug rotatably fitted in the tapered opening and provided with a pair of angularly-related transverse ports therethrough, each adapted separately in one rotative position of the plug to establish communication with the passageway and in a second rotative position to disestablish communication with the passageway, the valve plug being axially extended exteriorly of the body, a handle fitted non-rotatably to the plug end exteriorly of the body for operation of the valve plug, means for confining operative movements of the valve plug to a range between the two positions of the plug above noted, there being formed in the plug an axial bore communicating with one of the transverse ports and extending therefrom to the outer end of the plug, screw threads formed within the axial bore, a regulating screw within the bore coacting with the screw threads therein adapted, upon rotation, to advance toward and recede from the inner end of the bore whereby to open or close the communicating transverse port in varying degree, the outlet from the passageway being extended rearwardly through the valve body and being formed coaxially therewith with a screw-threaded bore extended forwardly through the valve body, a pressure regulating valve within the forwardly extending bore and in screw-threaded connection therewith adapted for operation from the front of the valve body to vary the opening through the outlet therefrom, and a screw-threaded closure plug fitted within the screw-threaded bore and disposed in part upon the front of the valve body adapted to conceal and protect the pressure-regulating valve to the rear thereof.

HARRY W. ANDERSON.